United States Patent [19]

Cwirzen

[11] 4,405,967

[45] Sep. 20, 1983

[54] GAS TUBE OVERVOLTAGE PROTECTOR WITH BACK-UP GAP

[75] Inventor: Casimir Cwirzen, Arlington Hts., Ill.

[73] Assignee: Northern Telecom Inc., Nashville, Tenn.

[21] Appl. No.: 327,572

[22] Filed: Dec. 4, 1981

[51] Int. Cl.[3] .............................................. H02H 9/06

[52] U.S. Cl. .................................... 361/124; 361/119; 361/120; 337/32; 337/34; 313/325

[58] Field of Search ............... 361/124, 119, 120, 125, 361/117, 56; 337/15, 28, 29, 32, 33, 34; 313/325, 231.11; 315/36

[56] References Cited

U.S. PATENT DOCUMENTS

| | | | |
|---|---|---|---|
| 2,546,824 | 3/1951 | Koliss | 337/34 X |
| 3,755,715 | 8/1973 | Klayum | 361/124 X |
| 4,074,337 | 2/1978 | Debortoli et al. | 361/124 |
| 4,132,915 | 1/1979 | Wilms | 313/325 |
| 4,327,393 | 4/1982 | Hines et al. | 361/124 X |

*Primary Examiner*—Patrick R. Salce

*Attorney, Agent, or Firm*—Schwartz, Jeffery, Schwaab, Mack, Blumenthal & Koch

[57] ABSTRACT

A gas tube overvoltage protector has two opposed electrodes sealed in a tubular dielectric housing, the outer ends of the electrodes extending from the housing. The inner ends of the electrodes define a primary gap at sub-atmospheric pressure. The lower electrode has an extension of reduced diameter on its outer end. An auxiliary gap is formed by pushing on a metal cap over the lower end of the dielectric housing, with a thin flexible dielectric member between the cap and the outer end of the bottom electrode, the extension extending through the dielectric member and cap. One or more apertures in the thin dielectric member define the auxiliary gap, between metal cap and bottom electrode. A further feature is that the cage, within which the protector is positioned, has one or more legs preformed such that their lower ends are pushed into positive contact with the metal cap when assembled into a closed ended hollow cap for assembly into a protector block.

10 Claims, 4 Drawing Figures

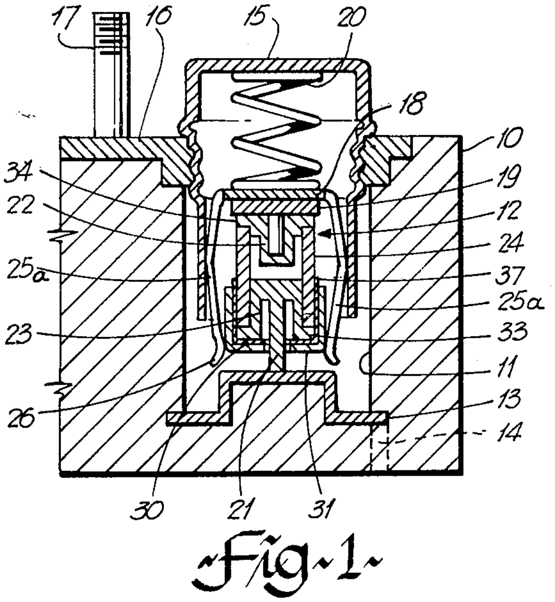
-Fig-1-
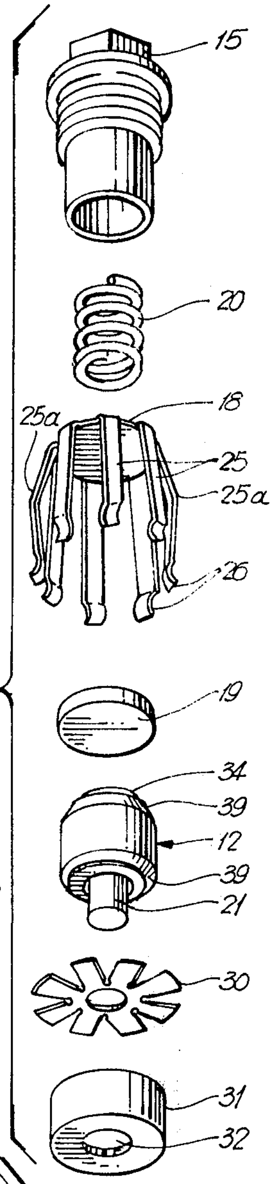
-Fig-2-
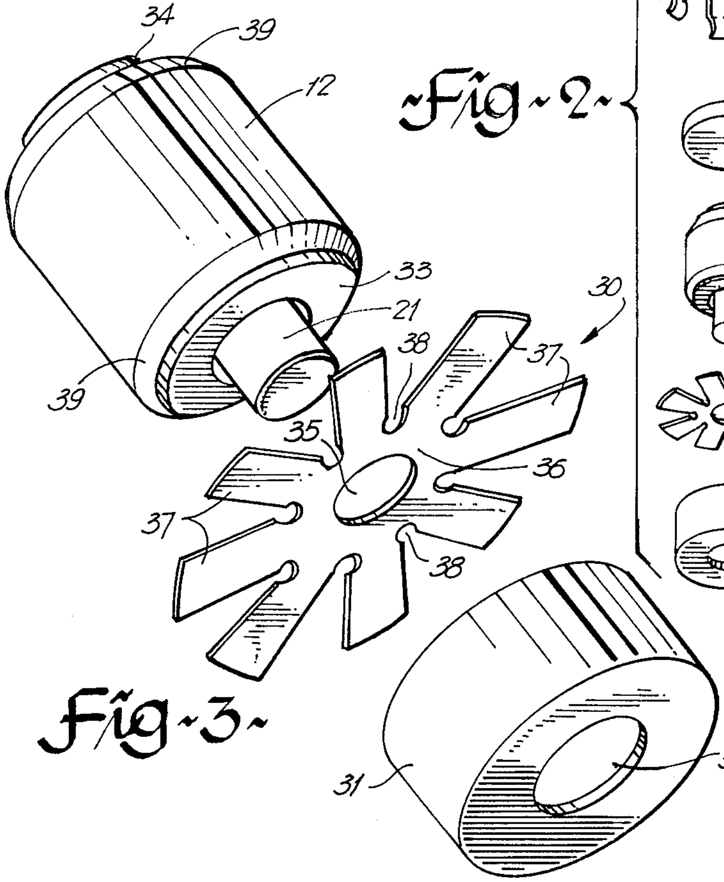
-Fig-3-

GAS TUBE OVERVOLTAGE PROTECTOR WITH BACK-UP GAP

This invention relates to gas tube overvoltage protectors and is particularly concerned with such protectors used to replace carbon electrodes in protectors, the gas tube being a direct replacement for a carbon electrode in a conventional protector block or housing.

In gas tube protectors, two spaced electrodes in a sealed tube form a gap, the gap at a sub-atmospheric pressure. If the seal breaks, the pressure at the gap rises to ambient, with a resulting substantial increase in breakdown voltage. The increase is such as to be unacceptable in many instances and various ways of providing an alternative breakdown path have been devised.

The present invention provides an auxiliary or back-up gap at one end of the gas tube. The auxiliary gap is formed between an end surface of one of the electrodes of the gas tube and a cap fitting over the end of the gas tube, the gap set by an intervening dielectric member, made from a flexible synthetic material. The auxiliary gap is such that breakdown occurs at a higher voltage than that which occurs in the gas tube when operational, but at a low enough value to prevent damage to associated equipment, and users of such equipment.

The invention will be readily understood by the following description of an embodiment, by way of an example, in conjunction with the accompanying drawings, in which:

FIG. 1 is a cross-section through part of a protector housing, or block;

FIG. 2 is an exploded perspective view of a protector assembly;

FIG. 3 is an exploded perspective view to a larger scale of the gas tube sub-assembly dielectric spacer and cap as used in FIG. 2;

Figure 4:
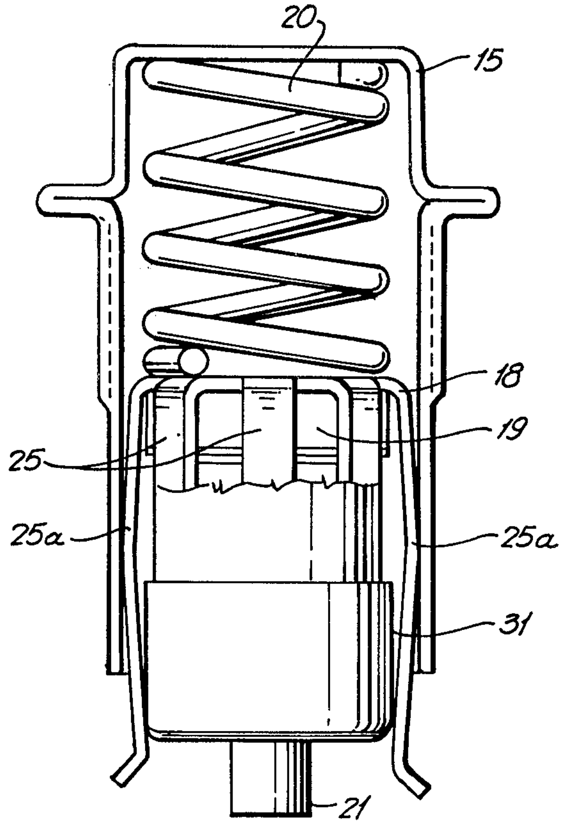
FIG. 4 is a side view of a protector assembly, with the cap in cross-section illustrating the shaping of two legs of the cage.

As illustrated in FIG. 1, a protector block 10 has a recess 11 in which is mounted a protector, indicated generally at 12. A base contact 13 is molded into the block with means for making an electrical contact thereto, as indicated at 14. A cap 15, closed at one end, has a threaded portion which screws into a top electrode 16 also generally molded into the block. A contact member or terminal 17 provides for electrical connection to the top electrode. The protector device is positioned in a metal cage 18, with a disc of low fusion-point material 19 positioned between the protector and the top of the cage 18. A compression spring 20 extends between the top of the cage 18 and the inside of the cap 15. The spring, acting on the cage, and thus through the disc 19 on to the protector 12, pushing an extension 21 on the bottom electrode of the protector against the base contact 13. The cage is held with the lower edge spaced from the base contact 13. The protector has two electrodes 22, 23 in opposition, the opposed inner ends defining a gap—the primary gap in the present invention.The electrodes are sealed in a tubular dielectric housing 24.

FIG. 2 shows the protector and associated parts in more detail. The cage 18 has a plurality of fingers 25 having arcuate contact portions 26 at their ends. The cap 15, with block 10, spring 20, cage 18 and disc 19 are conventional in that these are used for carbon block protectors, having two spaced apart carbon blocks acting as electrodes to set a primary gap. They are also used with the replacement gas tube protectors. Under normal conditions, breakdown occurs across the primary gap in the protector. In the event of continuous application of overload, and/or shorting of the gap, a thermal protection is provided by the disc 19. If the protector overheats, the disc fuses and the spring 20 pushes the cage 18 down and the contact portions 26 engage with the base contact 13. The base contact 13 is connected to ground.

Also in FIG. 2 the gas tube protector 12 is shown. Items 30 and 31 provide the back-up or auxiliary gap, in accordance with the present invention. Item 30 is a somewhat star shaped member cut from a flexible synthetic resin such as sold under the Trade Mark Mylar.$^{RTM.}$ A metal cap 31 is a press fit over the member 30 and the outside of the protector 12, the cap 31 has an aperture 32 in the end which is larger than the bottom electrode extension 21, to ensure no breakdown occurs between electrode and cap.

The protector 12, dielectric member 30 and cap 31 are seen to a larger scale in FIG. 3. The protector 12 can be of any form of internal construction, provided there is a protruding portion on the bottom electrode 23. The bottom electrode 23 also extends, at 33, over the base surface of the housing. The top electrode 22 also extends over the other end surface of the housing, at 34.

The dielectric member 30 has a central aperture 35 which is a fairly close fit over the electrode extension 21. There is then an annular portion 36, from which extend legs 37. The legs extend radially and at the conjunction of each pair of adjacent legs there is a circular aperture or opening 38. The apertures 38 are provided so that they are over the portion 33 of the bottom electrode 23. When the cap 31 is pushed on, the legs 37 are bent down along the outside of the protector. The legs 37 assist in the efficient assembly of the cap 31 to the protector. For example, the dielectric housing 24 of the protector is generally ceramic. It is likely that, without the intervening legs 37, the ceramic housing would scrape off small particles of metal from the inner surface of the cap as they are assembled. These particles could cause electrical shorting of the device, which would therefore be of no use. Further, as the member 30, and thus the legs 37, are of a flexible material, the legs can provide for some reduction in tolerance requirements. With the cap in place there will be a gap between portion 33 of electrode 23 and the end of the cap. The dielectric housing 24 is chamfered, at 39 to assist in assembly of the cap 31 to the housing. Conveniently the housing is chamfered at both ends to avoid orientation of the housing 24 on assembly. There are in fact several gaps, one at each aperture 38. This is the auxiliary or back-up gap. The auxiliary gap will be less than the primary gap inside the gas tube but is of a predetermined spacing such that the breakdown voltage of the auxiliary gap is greater than the breakdown voltage across the primary gap in the gas tube, but less than the breakdown voltage across the primary gap should the gas tube fail, as by becoming vented to atmosphere.

The cap 31 is electrically isolated from the electrode 23. It is therefore acceptable for the cage fingers 25 to contact the cap 31. It can be desirable for contact between cage and cap 31 to be definitely provided to assume that the auxiliary gap maintains ground. Some of the fingers, for example two, indicated at 25*a* in FIG. 4, are deliberately bent first outward and then inward for the lower part of each finger. As the cage, and gas tube, are inserted into cap 15, legs 25*a* are pushed in so as to firmly contact or grip the cap 31. This ensures good electrical contact with the cap 31 by the cage 18 and thus with the cap 15, via the legs 25*a* and the spring 20. At a minimum only one leg need be specifically formed, at at 25*a*, but preferably at least two, at opposite sides, are so formed. Back-up breakdown then occurs between cap 31 and portion 33 of electrode 23 through one or more apertures 38 in the dielectric member 30 and thus by the protruding extension 21 to the bottom contact 13, thence to ground.

For normal domestic use, housing 10 will have four recesses each holding a protector assembly as in FIGS. 2 and 3. Other numbers of protectors can be provided, as required.

What is claimed is:

1. A gas tube overvoltage protector comprising:

a tubular dielectric housing;

two opposed electrodes sealed in said housing, said electrodes having opposed inner end surfaces defining a primary gap, said gap at a sub-atmospheric pressure;

said electrodes forming upper and lower electrodes and including outer ends extending from said dielectric housing;

an extension of reduced diameter extending axially from said outer end of the lower electrode;

a metal cap fitting over said dielectric housing at a lower end, said cap having an aperture, said extension extending through said aperture, there being a clearance between said cap and said extension sufficient to prevent electrical breakdown between the cap and the extension;

a thin dielectric member positioned between said metal cap and the adjacent outer end of the lower electrode, said extension passing through said dielectric member;

at least one aperture in said dielectric member, said aperture defining an auxiliary gap between said outer end of the lower electrode and said metal cap.

2. A protector as claimed in claim 1, said thin dielectric member comprising a central annular portion, a plurality of legs extending out from said annular portion, and an aperture at the conjunction of each pair of legs at said annular portion, said apertures forming a plurality of auxiliary gaps.

3. A protector as claimed in claim 2, said dielectric member comprising a thin film of flexible synthetic resin.

4. A protector as claimed in claim 2, said legs having parallel sides, said legs extending between the outer periphery of said dielectric housing and the metal cap.

5. A protector as claimed in claim 1, said auxiliary gap of a dimension equal to the thickness of the thin dielectric member.

6. A protector as claimed in claim 1, said tubular dielectric housing including a chamfer at least at one end on its outer periphery, to assist in assembly of said metal cap to said dielectric housing.

7. A protector as claimed in claim 1, further including:

a metal cage having a circular top and a plurality of legs depending from said top;

a disc of low melting point material in said cage in contact with said top;

said tubular dielectric housing positioned within said cage, said upper electrode in contact with said disc;

lower ends of said legs of said cage positioned adjacent to a lower end of said metal cap on said tubular dielectric housing;

said extension extending beyond said lower ends of said legs.

8. A protector as claimed in claim 7, at least one of said legs having an initial outward inclination, the leg then having a further inward inclination for positive contact with said metal cap.

9. A protector as claimed in claim 8, including two legs on opposite sides of said cage having an initial outward inclination and a further inward inclination, for positive contact with said metal cap.

10. A protector as claimed in claim 8, further including a hollow cap closed at a top end and having a cylindrical tubular body, and a compression spring in said hollow cap in contact with the top end of the hollow cap, the metal cage positioned in said tubular body, said at least one of said legs pushed inward by said tubular body to provide said positive contact.

* * * * *